No. 768,630. PATENTED AUG. 30, 1904.
C. DE SEDNEFF.
ELECTRIC ACCUMULATOR.
APPLICATION FILED JULY 28, 1902.
NO MODEL.
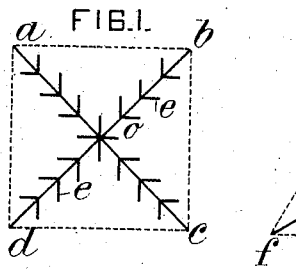
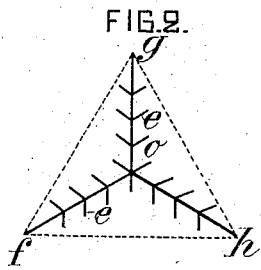
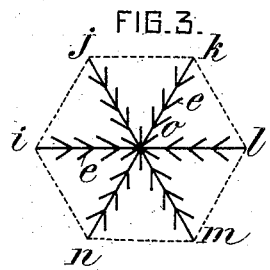
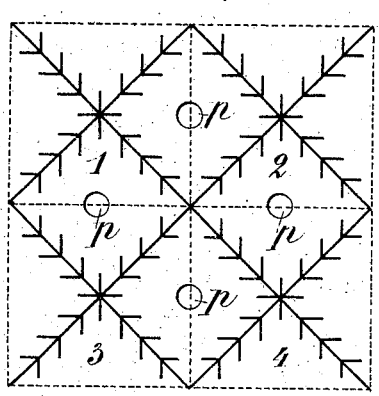
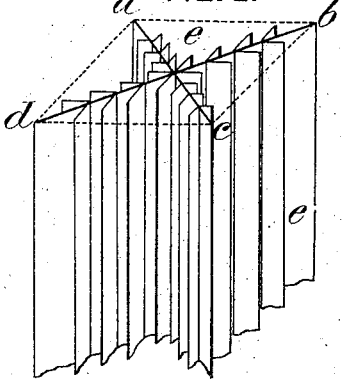
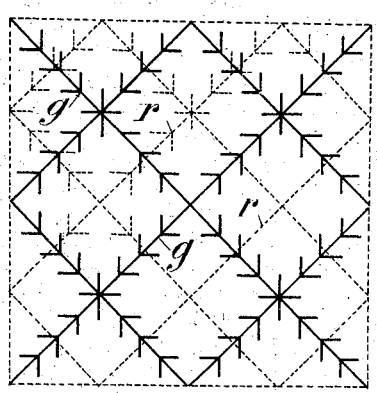
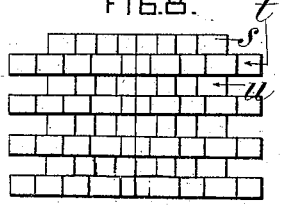
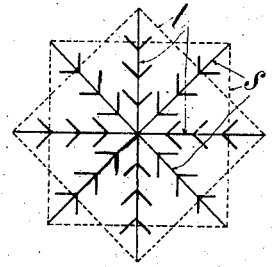
WITNESSES: INVENTOR
Constantin de Sedneff,
BY
ATTORNEY No. 768,630. Patented August 30, 1904.

UNITED STATES PATENT OFFICE.

CONSTANTIN DE SEDNEFF, OF PARIS, FRANCE.

ELECTRIC ACCUMULATOR.

SPECIFICATION forming part of Letters Patent No. 768,630, dated August 30, 1904.

Application filed July 28, 1902. Serial No. 117,382. (No model.)

*To all whom it may concern:*

Be it known that I, CONSTANTIN DE SEDNEFF, a subject of the Emperor of Russia, and a resident of 5 Rue Victor Massé, Paris, in the Republic of France, have invented new and useful Improvements in or Relating to Electric Accumulators, which invention is fully set forth in the following specification.

The present invention relates to electric accumulators, and has for its object to provide an accumulator of a great capacity, which at the same time is strong and light and in which the electromotive force instead of rapidly falling to about 1.7 to 1.8 volt falls slowly and gradually through the effect of polarization, as is the case in a primary battery. Moreover, in the accumulator according to this invention a complete utilization of the oxid of lead is realized, and, finally, only a single type of plate is used, preferably a frame or lattice work of a particular construction, whereby all conditions are fully complied with in practical use.

The various systems of accumulators can be divided into two distinct categories—first, the self-generating accumulators with a large surface area, (system Planté;) second, the heterogeneous accumulators, (system Faure.) In the former the surface of lead is utilized, which upon its formation is covered with a thin layer of oxid or an active substance produced at the expense of the metal, and it is this substance alone which gives the accumulator the capacity of storing up electric energy when charged and of replacing it when discharged, (Planté theory.) In the second form of accumulator this property of oxids of lead is used, they being applied mechanically to a support of metallic lead, which merely serves for retaining the oxids and to insure the passage of the current, (Faure theory.) It is clear, then, that in these two types of accumulators only the oxids of lead have an efficacious function, whether they are formed at the expense of the metallic support by the process of the electrochemical formation or whether they are applied by a mechanical process irrespective of the degree of oxidation of the product, either sulfate or suboxid or any other oxid.

In order to produce an accumulator of great capacity and strength and at the same time of small weight, it is necesary to take into careful consideration the rules governing electrochemical reactions as regards accumulators in order to avoid the presence of useless matter which increases the weight of the elements without any corresponding advantage and complicates the fundamental reaction by a series of secondary reactions which have no other consequence than the shortening of the duration of the elements. In the first place it is necessary that the relative quantities of oxid should be so chosen as to precisely realize Faraday's law "When a current traverses a body susceptible of being decomposed into its elements, the weight of the decomposed body is in proportion to the quantity of electricity which has passed through the same and the weights of the separate elements are in the same proportion to one another as their atomic weights." If, in fact, this law were strictly observed, accumulators should not present a sudden fall of potential at a point determined by their period of discharge, (about 1.8 to 1.7 volt,) but a slow and continuous reduction of their electromotive force, as is the case in a galvanic or primary element. Thus it is evident that if this law were observed in the choice of the proportions of the material used in the manufacture of accumulators batteries would have been made in which the oxids were completely utilized, whereas in reality they have all been constructed with proportions due to either chance or derived from experimental calculations.

At present no pure Planté accumulators are built which allow of obtaining an adhesive layer of oxid of sufficient thickness the formation of which is, moreover, lengthy and very expensive. Endeavors have been made to accelerate the formation in Planté's accumulators, or rather to cause this formation during the normal working of the element, by using positive plates in which the weight of lead is very high and in which a small quantity of oxid is applied in order to give to the element before the Planté formation has commenced a sufficient initial capacity. It will be easily understood that under these conditions the proportion of the weight of lead and of the active matter applied can easily be varied in such a manner that certain accumulators made in this manner approach the efficiency of the Faure type of accumulator. In all accumulators belonging to this mixed category with the exception of the Khotinsky (Pulvis) accumulator, which does not employ oxid, but lead in an extremely fine state of division, (molecular lead,) the active matter only serves to give the element an initial capacity. This active matter is destined to drop as soon as by the regular working of the element the Planté formation of metallic lead has formed a sufficient layer of oxid in order to give it the same capacity. Thus it is necessary that in these elements the surface of metallic lead should be such that the capacity remains constant even after the disappearance of the applied oxid layer, and consequently that this surface should offer an exposure such that the quantity of oxid produced in a layer not exceeding one-half millimeter in thickness should be equal to that placed in the cavities formed by that surface; but as the Planté formation always intervenes in order to give these elements their final state it happens, as in all the Planté formations, that the negative-pole plates are more rapidly discharged than the positive-pole plates (see with regard to this the works of Professor Schoop) and that finally the quantity of active matter on the two plates always varies after the complete formation just the same as before the formation. Even if admitting that the oxid layer upon the elements is utilized and that the latter instead of falling remains in place there is in the methods used no guarantee of the possibility of obtaining equal quantities of oxid upon both electrodes, as the raised proportion between the weight of the lead and that of the active matter does not allow of foreseeing to what exact extent the oxid can usefully be formed and of what solidity or weight the lead-support will be.

All accumulators above mentioned have always been noted for their great stability. They are almost the only accumulators used for train service, and although the addition of oxids is principally made to accelerate the formation and to render it less expensive the results obtained are nevertheless already an indication of advantages which can be obtained from the direct utilization of oxid-coatings according to Faure's process. The greater part of accumulators of a large capacity at present in use have been made in this manner—as, for instance, those of Tommasi (Fulmen) Bouquet, Garoin-Schrive, Cantal, Phoenix, &c. In all these batteries the oxids are applied to frames or grids of lead of various forms; but none of them give the results which according to the electrochemical law should be obtained from the quantity of oxid employed.

Calculations show that the capacity of the oxids of lead, and particularly of the peroxid, attains an extremely-high figure when the substance is utilized in a complete and rational manner. Moreover, in order to make the utilization complete it is necessary that the chemical equivalent quantity of base element—for example, the quantity of molecular lead added in the form of oxid—should be precisely the same upon both electrodes, as is the case when all electrodes are provided with an identical initial coating as regards composition and weight. This condition has hardly ever been considered in the type of Faure's accumulators as hitherto constructed. On the other hand, it is not sufficient in order to obtain from an accumulator the best yield possible to exactly follow the law given by Faraday. The necessary precautions should always be taken against the phenomenon of polarization produced on the surface of the electrodes, and, moreover, good conductivity should always be maintained.

If one considers that in many accumulators of the Faure type a great part of the weight of oxid remains beyond the scope of the reactions, this dead-weight, without altering the capacity, can be replaced by an equal weight of conducting metal, so as to increase the solidity of the element and the contact-surface in the element between the conductive metal and the oxids. Thus from the added oxid can be obtained the whole theoretical yield if the conductive grating upon which it is carried has a sufficient surface and conducts the current through all points of the oxid mass. This condition is not complied with in accumulators having a grating in the shape of a frame which presents but a small surface in order to diminish the effects of polarization or where the coating forms compact masses, filling up the spaces of the frame at a great distance from it; but this condition is complied with, on the other hand, in the accumulator forming the object of the present invention and which has, besides, the following essential characteristics:

First. The reactions on charging as well as on discharging are produced according to the laws of electrochemistry, provided that—

(a) The identity in quantity of lead between the two electrodes is obtained in the simplest manner, because the quantity of added oxid is the same on both the positive and the negative plates, and the nature of this oxid being the same it results that the two plates contain the same number of molecules of lead capable of participating in the reactions. From this it results that the electromotive force, instead of falling rapidly to nearly 1.7 to 1.8 volt, will drop slowly and gradually through the effect of polarization, as is the case in a primary battery.

(b) The complete utilization of the oxids of lead is insured through the judicious choice of the relation between the surface presented by the grating and the quantity of oxid, whereby polarization is sufficiently reduced without reducing the capacity of the oxid used. In the frame or grating of particular shape which I prefer to employ for this purpose the surface of contact between the metallic lead and the coating is several times larger than that which is obtained with ordinary grid elements.

Second. The frame or grating is so constructed as to allow the use of a single type of plate, complying with all conditions of practical use and at the same time possessing the lightness and rigidity desired and is suitable both for stationary batteries as well as for traction service. The frame gives a proportion of about 2.6 between the weight of lead and that of the active matter, while at the same time offering the same specific capacity as that of accumulators where the proportion is not more than 0.54. This quantity of lead (about five times as large) gives to my accumulator an absolute solidity and at the same time allows in the case, which is scarcely probable, where a certain quantity of oxid should happen to become detached and fall the formation of a layer of peroxid by Planté formation on the frame in an analogous manner to that which is produced in certain types of accumulators of great surface and without this formation of oxid injuring the solidity of the whole, as it happens only in exceptional cases and not generally on principle.

In the drawings, in which, by way of example, various forms of the plates are illustrated, Figure 1 shows one specific form of the grid according to my invention. Figs. 2 and 3 are modifications thereof. Fig. 4 shows a grid formed by the combination of elements of the kind shown in Fig. 1. Fig. 5 is a grid similar to the above, but in which the arrangement of the elements instead of coinciding is reversed on each side of the central plane of the plate. Fig. 6 is a grid in which the repetition of the element shown in Fig. 1 is effected by superposition in a vertical direction, so as to produce a prismatic construction. Figs. 7 and 8 show an arrangement in which each element is set at forty-five degrees with regard to the elements adjacent to it.

The total surface of the grid can be composed of a certain number of elements which are so arranged as to entirely cover it. These elements can either take the form of a square, of an equilateral or isosceles triangle or a hexagon or any other geometric shape the repetition and juxtaposition of which allows of entirely covering any desired surface. If, for instance, the element receives the form of a square, ($a\ b\ c\ d$, Fig. 1,) the new type of grid the invention of which I claim will be composed of two diagonals $a\ c$, $b\ d$, from which project branch ribs $e$ set at forty-five degrees with regard to the diagonals—viz., parallel to the sides $a\ b$, $b\ c$, $c\ d$, $d\ a$, respectively of the square. The paste fills up all the space inclosing the diagonals and the ribs.

The two diagonals themselves give a contact-surface which has 1.41 times the surface of the square frame $a\ b\ c\ d$. The ribs $e$, which increase this surface to four times that of the square $a\ b\ c\ d$, are set at equal distances from one another and have a uniform degree of projection. As, moreover, the projecting portions of the ribs are equal to their spacing, or, in other words, each rib $e$ terminating at a point at right angles or opposite to the root or beginning of the preceding rib, (so that the ribs as a whole form a kind of staircase device,) it follows that the active matter is at no points between the parallel surfaces brought together, which prevents, on the increase of volume of the oxid due to peroxidation, the development of considerable mechanical efforts tending to deform the support. Moreover, as this expansion necessarily takes place in a direction parallel to the ribs $e$ the active matter preserves, in spite of the variations of volume, a permanent contact with the conductive support and at all the points on the latter. The expansion being equal, as the figure is symmetrical around its center $o$, the support cannot undergo any deformation, as the results of the expansive efforts is *nil*.

Instead of being square the element can have any other geometrical form. Thus it can form, Fig. 2, an equilateral triangle $f\ g\ h$ or a hexagon $i\ j\ k\ l\ m\ n$, Fig. 3. The result is the same. A metallic contact-surface is obtained always large enough to insure the production of the current at all points of the active matter, and consequently to allow the complete utilization of the substance. On the other hand, the superficial form of the element chosen can be repeatedly arranged in lateral or longitudinal juxtaposition, thereby forming, as shown in Fig. 4, either a grid of a single thickness constituted by the juxtaposition of parts 1, 2, 3, and 4, which are identical with that shown in Fig. 1. This element being formed, holes $p$ are provided in the active matter in the centers of the small squares in order to facilitate the expansion of the mass. By alternating the meeting points of the diagonals of two solid grids an element of two thicknesses can be formed. In Fig. 5, in which this arrangement is shown, the first grid $g$ is indicated in full lines and the diagonals $r$ of the second grid are shown in dotted lines, each of these two gratings being one-half of the thickness of the plate. The repetition of the superficial element could also be made in longitudinal direction, so that a prismatic body could be formed having the required thickness or depth, as shown in Fig. 6, of the square or cross element $a\ b\ c\ d$. It is evident that the prism could be of triangular or hexagonal form, &c. Moreover, in this repetition of the selected form it is not necessary to set the ribs in a continuous arrangement or direction. As shown, for example, in Figs. 7 and 8, an element $s$ of a certain height can follow an element $t$ turned at an angle of forty-five degrees with regard to the former, after which an element $u$ occupies the same relative position as the first, $s$, and so on.

It is to be noted that in all the foregoing forms the angular direction of the ribs $e$ with regard to the diagonals or bisectors has for its object to give to the resultant of the mechanical efforts due to the expansion of the oxids such a direction as to prevent any undesirable influence upon the cohesion to the support and on the active matter or upon the contact between the two parts. This improvement constitutes a feature of considerable importance when its results are compared with those obtained by the majority of large surface-plates—as, for instance, those of the Tudor accumulator, in which, if it is built without a core, the expansion takes place perpendicularly to the ribs, which are strongly compressed, and the plate becomes deformed under these strains, while if the accumulator has a core the oxid layer is forced back perpendicularly to the ribs, owing to a slight inclination of their faces and drops. On the contrary, according to the present invention the active matter is completely retained, owing to the staircase arrangement of the ribs in such a manner that the resultant of the efforts developed is *nil* and that, nevertheless, the mass is retained by the ribs, which prevent it from dropping.

Having thus described the fundamental principles of my invention, various combinations of which it is capable may be described, which all accord with the fundamental laws of electrochemistry and, moreover, prove very satisfactory under the conditions which concern the practical use of accumulators.

In the following it must not be overlooked that in the adoption of an elementary form for the two electrodes of an accumulator of the type described is understood a form with the same proportion between the weight of lead and that of the matter to become active and with an equal weight of the active matter for both electrodes. In this way one of the electrodes can, for instance, receive the form of a grid of the type shown in Fig. 4. Supposing this grid is formed with a total of twenty elementary squares of three millimeters thickness, it will be evident that on making the other electrode in the form of a prism of a suitable height similar to that shown in Fig. 6 and equal to twenty multiplied by three millimeters this electrode will have the same weight, mass, and relation between lead and the active matter as the first. From Faraday's standpoint they will be identical, yet if each of the squares has a surface of four square centimeters the external or gross surface of the primary electrode will be twenty multiplied by four equals eighty square centimeters, while the surface of the secondary electrode will be forty-eight square centimeters. Thus we have a proportion of the external surfaces $=\dfrac{80}{48}=1.66$. This proportion can evidently be modified at will without changing the electrochemical identity of the electrodes. It is this capacity, combined with the greatest facility of the external unequal surfaces with an equal weight of lead and oxid on both electrodes, which constitutes also one of the most important features of this invention. In fact, the normal polarization of an element takes place upon the metallic surface of the support, and under these conditions an accumulator subjected to the normal charge and discharge should simply have equal metallic surfaces and equal external surfaces upon the two electrodes. On the other hand, an accumulator which is intentionally subjected to abnormal rates of charge and discharge presents an interesting consideration.

The volumes of gas due to the decomposition of the water are, as is well known, in the proportion of two to one. Moreover, when the accumulator is subjected to a rapid rate, either charge or discharge, the liberation of the gas is very rapid, and it tends to form on the external surface of the electrode a gaseous layer similar to that of steam in the spheroidal state of water. This bar conducting layer tends to reduce the available voltage at the terminals of the elements upon discharge and to considerably increase the resistance in charging. As this gaseous layer has for the hydrogen as well as for the oxygen the same adhesive effect on the wall of the electrode, it has the tendency to maintain an equal thickness; but since the volumes are in the proportion of two to one it follows that in order to have an equal liberation upon both electrodes it is necessary to make the surface of the electrode for giving off the hydrogen gas considerably larger than that for the disengagement of the oxygen. At the same time this proportion need not necessarily be two, as the affinity of the oxid for hydrogen is greater than that of the molecular lead for the oxygen.

In case an accumulator is destined for a slow charge and a rapid discharge it will be convenient to increase the external surfaces of the positive-pole electrode. On the contrary, if a rapid charge is required with a slow discharge the negative-pole electrode will have to be increased.

When accumulators were constructed for a rapid charge, experiments pointed to the necessity of differentiating the surfaces; but the external surface of the negative-pole electrode was confounded with its metallic surface, which led to the construction of negative plates containing enormous quantities of useless oxid which only constituted dead-weight.

In practice when the plates are completed and ready for use by being placed in the cells and formed the plate shown in Fig. 4 would be simply a square flat plate, the frame or grid being completely filled up by the active matter to the outline shown in dotted lines. In the same condition the plate or element shown in Fig. 6 would be a solid "cube" or "prism," as I prefer to call it, the length being greater than the other dimensions. In placing these elements in the cells the form shown in Fig. 4 may be used for the negative plate, while that of Fig. 6 may be used for the positive plate. The positive plate or prism of solid figure may then be placed between two flat negative plates, with its faces either parallel to those of the flat plates or with its edges turned toward the said plates and its faces at an angle of forty-five degrees.

Whatever the arrangements may be, it must be understood that I do not strictly limit my invention to the particular constructions described and represented in the accompanying drawings, as they have been merely described by way of example, and I reserve my right to vary the details of construction and arrangement as required by the practice without exceeding the scope of this invention.

I claim—

1. In an electric accumulator, positive and negative plates, each plate comprising conducting-supports, active material covering said supports, the metallic element of said active material being equivalent in weight for the two plates and the exposed surfaces of the two plates differing in area.

2. A plate for electric accumulators comprising a grid or frame of metal formed with members disposed radially about a common center, active material covering and embedding said members, and perforations in said active material substantially as described.

3. A plate for electric accumulators comprising two or more frames or grids each having radial arms symmetrically arranged about a common center, said grids each being covered and embedded in active material, and all being superposed with their centers in one line, to form a single electrode, substantially as described.

4. A plate for electric accumulators comprising a frame or grid having arms or branches arranged symmetrically about a center, each arm or branch having shorter projecting arms or branches at recurring intervals so arranged that a line drawn across the points of any pair of short branches will intersect the main branch at a point nearer than that of the attachment of the next pair of short branches, substantially as described.

5. In an electric accumulator, positive and negative plates, each plate comprising frames of metal formed with members disposed radially about a common center, active material covering and embedding said members, the metallic element of said active material being equivalent in weight for the two plates and the exposed surfaces of the two plates differing in area.

6. In an electric accumulator, positive and negative plates, each plate comprising one or more frames, of metal formed with members disposed radially about a common center, active material covering and embedding said member, the weight of the metal frame being about 2.6 times that of the active material and the metallic element of said active material being equivalent in weight for the two plates.

7. In an electric accumulator, positive and negative plates, each plate comprising one or more frames of metal formed with members disposed radially about a common center, active material covering and embedding said members, the weight of the metal frame exceeding that of the active material and the metallic element of said active material being equivalent in weight for the two plates.

8. In an electric accumulator, positive and negative electrodes, each electrode comprising one or more metal supports, active material covering and embedding each support, the weight of the metal support being about 2.6 times greater than that of the active material whereby all the active material on each plate is rendered available and both electrodes being provided with chemically-equivalent amounts of active material.

In testimony whereof I have signed this specification in the presence of two subscribing witnesses.

CONSTANTIN DE SEDNEFF.

Witnesses:
EMILE LEDRET,
EDWARD P. MACLEAN.